(12) United States Patent
Lv

(10) Patent No.: US 11,153,609 B2
(45) Date of Patent: Oct. 19, 2021

(54) METHOD AND APPARATUS FOR LIVE STREAMING

(71) Applicant: GUANGZHOU KUGOU COMPUTER TECHNOLOGY CO., LTD., Guangzhou (CN)

(72) Inventor: Xianguang Lv, Guangzhou (CN)

(73) Assignee: GUANGZHOU KUGOU COMPUTER TECHNOLOGY CO., LTD., Guangdong (CN)

(*) Notice: Subject to any disclaimer, the term of this patent is extended or adjusted under 35 U.S.C. 154(b) by 139 days.

(21) Appl. No.: 16/618,065

(22) PCT Filed: Nov. 26, 2018

(86) PCT No.: PCT/CN2018/117506
§ 371 (c)(1),
(2) Date: Nov. 27, 2019

(87) PCT Pub. No.: WO2019/128592
PCT Pub. Date: Jul. 4, 2019

(65) Prior Publication Data
US 2020/0162765 A1    May 21, 2020

(30) Foreign Application Priority Data
Dec. 29, 2017 (CN) .......................... 201711482284.2

(51) Int. Cl.
*H04N 21/258* (2011.01)
*H04N 21/2187* (2011.01)
(Continued)

(52) U.S. Cl.
CPC ..... *H04N 21/2187* (2013.01); *H04N 21/2402* (2013.01); *H04N 21/262* (2013.01)

(58) Field of Classification Search
None
See application file for complete search history.

(56) References Cited

U.S. PATENT DOCUMENTS

| 10,834,432 B2 * | 11/2020 | Chen ................ H04N 21/25875 |
| 2014/0192200 A1 | 7/2014 | Zagron |

(Continued)

FOREIGN PATENT DOCUMENTS

| CN | 106101764 A | 11/2016 |
| CN | 106453289 A | 2/2017 |

(Continued)

OTHER PUBLICATIONS

International search report in PCT application No. PCT/CN2018/117506 dated Mar. 4, 2019.

(Continued)

*Primary Examiner* — Nasser M Goodarzi
*Assistant Examiner* — Terrika Peterson
(74) *Attorney, Agent, or Firm* — Knobbe Martens Olson & Bear LLP

(57) ABSTRACT

Disclosed are a method and an apparatus for live streaming. The method includes: collecting, by a first terminal, live streaming audio data and first live streaming image data in a live streaming process; sending, by the first terminal, the live streaming audio data and the first live streaming image data to a server, and sending, by the first terminal, a first device identifier of the first terminal to the server; sending, by the first terminal, the live streaming audio data to a second terminal; collecting, by the second terminal, second live streaming image data; and sending, by the second terminal, the second live streaming image data and the live streaming audio data to the server, and sending, by the second terminal, a second device identifier of the second terminal to the server.

11 Claims, 9 Drawing Sheets

(51) Int. Cl.
*H04N 21/24* (2011.01)
*H04N 21/262* (2011.01)
*H04N 21/234* (2011.01)

(56) References Cited

U.S. PATENT DOCUMENTS

2016/0056927 A1 2/2016 Liu et al.
2019/0320211 A1* 10/2019 Chen .............. H04N 21/234309

FOREIGN PATENT DOCUMENTS

| | | |
|---|---|---|
| CN | 106484349 A | 3/2017 |
| CN | 106506554 A | 3/2017 |
| CN | 106507125 A | 3/2017 |
| CN | 106791892 A | 5/2017 |
| CN | 106792449 A | 5/2017 |
| CN | 108093268 A | 5/2018 |
| WO | WO 2008/138047 A1 | 11/2008 |

OTHER PUBLICATIONS

First office action in Chinese application No. 201711482284.2 dated Mar. 19, 2019.
Second office action in Chinese application No. 201711482284.2 dated Sep. 27, 2019.
Extended European Search Report in EP application No. 18895114.9 dated Apr. 22, 2020.
Third Office Action in Chinese application No. 201711482284.2 dated Jun. 11, 2020.

* cited by examiner

METHOD AND APPARATUS FOR LIVE STREAMING

The present disclosure is a US national phase application of the International Patent Application No. PCT/CN2018/117506 filed on Nov. 26, 2018 which claims priority of the Chinese Patent Application No. 201711482284.2 filed on Dec. 29, 2017 and entitled "METHOD AND APPARATUS FOR LIVE STREAMING", the entire contents of which are incorporated herein by reference.

TECHNICAL FIELD

The present disclosure relates to the field of Internet technologies, and in particular, relates to a method and apparatus for live streaming.

BACKGROUND

With the development of the Internet technologies, mobile phones, computers and other terminals have been widely used. Accordingly, the types of applications on the terminals are increasing, and functions of the applications are becoming more and more abundant. Among these applications, a network-based live streaming application is a very common application.

SUMMARY

Embodiments of the present disclosure provide a method and an apparatus for live streaming. The technical solutions are as follows.

In one aspect, a method for live streaming is provided. The method includes:

collecting, by a first terminal, live streaming audio data and first live streaming image data in a live streaming process;

sending, by the first terminal, the live streaming audio data and the first live streaming image data to a server, and sending, by the first terminal, a first device identifier of the first terminal to the server;

sending, by the first terminal, the live streaming audio data to a second terminal;

collecting, by the second terminal, second live streaming image data; and sending, by the second terminal, the second live streaming image data and the live streaming audio data to the server, and sending, by the second terminal, a second device identifier of the second terminal to the server.

Optionally, prior to the collecting, by the first terminal, the live streaming audio data and the first live streaming image data in the live streaming process, the method further includes:

broadcasting, by the first terminal, a pairing request;

receiving, by the second terminal, the pairing request broadcast by the first terminal;

sending, by the second terminal, a pairing response message to the first terminal;

displaying, by the first terminal, a prompt box for prompting whether to set the second terminal as a pairing terminal when the first terminal receives the pairing response message sent by the second terminal; and recording, by the first terminal, the second terminal as the pairing terminal to which the live streaming audio data is sent when the first terminal receives a confirmation instruction sent by the prompt box.

Optionally, prior to the collecting, by the first terminal, the live streaming audio data and the first live streaming image data in the live streaming process, the method further includes:

performing, by the first terminal, live streaming start processing when the first terminal receives a live streaming start instruction, and sending, by the first terminal, a live streaming start message to the second terminal, the live streaming start message carrying link information of the server, and the link information including address information and a live streaming room identifier; and performing, by the second terminal, the live streaming start processing according to the link information of the server.

Optionally, the method further includes:

counting, by the second terminal, a transmission packet loss rate of the live streaming audio data sent by the first terminal;

sending, by the second terminal, the transmission packet loss rate to the first terminal; and stopping, by the first terminal, sending the live streaming audio data to the second terminal if the transmission packet loss rate is greater than a preset threshold.

Optionally, the live streaming start message further carries a sampling rate of the live streaming audio data, and the sending, by the second terminal, the second live streaming image data and the live streaming audio data to the server includes:

determining, by the second terminal, a frame duration of each audio frame of the live streaming audio data according to the sampling rate;

each time when the second terminal receives one audio frame of the live streaming audio data, adjusting, by the second terminal, a timestamp of the received audio frame to a time obtained by subtracting the frame duration of the audio frame from a current time; and sending, by the second terminal, live streaming audio data obtained after the timestamps are adjusted as well as the second live streaming image data to the server.

In another aspect, a method for live streaming is provided. The method includes:

receiving, by a server, first live streaming image data, live streaming audio data and a first device identifier of a first terminal sent by the first terminal, and receiving, by the server, second live streaming image data, the live streaming audio data and a second device identifier of a second terminal sent by the second terminal;

determining, by the server, a terminal having the same video mode as the first terminal and a terminal having the same video mode as the second terminal based on the first device identifier, the second device identifier, and device identifiers of other terminals in a live streaming room corresponding to the first terminal; and sending, by the server, the first live streaming image data and the live streaming audio data sent by the first terminal to the terminal having the same video mode as the first terminal, and sending, by the server, the second live streaming image data and the live streaming audio data sent by the second terminal to the terminal having the same video mode as the second terminal.

Optionally, the determining, by the server, the terminal having the same video mode as the first terminal and the terminal having the same video mode as the second terminal based on the first device identifier, the second device identifier, and the device identifiers of the other terminals in the live streaming room corresponding to the first terminal includes:

determining a terminal whose device identifier belongs to the same device identifier group as the first device identifier and a terminal whose device identifier belongs to the same device identifier group as the second device identifier from the other terminals in the live streaming room based on pre-established device identifier groups, wherein the device identifier groups include a first device identifier group and a second device identifier group, a video mode of the terminal corresponding to the device identifier in the first device identifier group is a horizontal screen mode, and a video mode of the terminal corresponding to the device identifier in the second device identifier group is a vertical screen mode; and the sending, by the server, the first live streaming image data and the live streaming audio data sent by the first terminal to the terminal having the same video mode as the first terminal, and sending, by the server, the second live streaming image data and the live streaming audio data sent by the second terminal to the terminal having the same video mode as the second terminal includes:

sending, by the server, the first live streaming image data and the live streaming audio data sent by the first terminal to the terminal whose device identifier belongs to the same device identifier group as the first device identifier, and sending, by the server, the second live streaming image data and the live streaming audio data sent by the second terminal to the terminal whose device identifier belongs to the same device identifier group as the second device identifier.

In another aspect, a system is provided. The system includes a first terminal, a second terminal and a server.

The first terminal is the first terminal as described above

The second terminal is the second terminal as described above.

The server is the server as described above.

According to an eighth aspect of embodiments of the present disclosure, an electronic device is provided. The electronic device includes a processor and a memory, wherein the memory stores at least one instruction, at least one program, a code set or an instruction set which is loaded and executed by the processor to perform the method for live streaming as described above.

In another aspect, a server is provided. The server includes a processor and a memory, wherein the memory stores at least one instruction, at least one program, a code set or an instruction set which is loaded and executed by the processor to perform the method for live streaming as described as described above.

In another aspect, a computer-readable storage medium is provided. The storage medium stores at least one instruction, at least one program, a code set or an instruction set which is loaded and executed by the processor to perform the method for live streaming as described above.

In another aspect, an apparatus for use in live streaming is provided. The apparatus includes:

a processor; and a memory for storing instructions executable by the processor;

wherein the processor is configured to execute instructions executable by the first terminal in the method as described above.

In another aspect, an apparatus for use in live streaming is provided. The apparatus includes:

a processor; and a memory for storing instructions executable by the processor;

wherein the processor is configured to execute instructions executable by the second terminal in the method as described above.

In another aspect, an apparatus for use in live streaming is provided. The apparatus includes:

a processor; and a memory for storing instructions executable by the processor;

wherein the processor is configured to execute the following instructions:

receiving first live streaming image data, live streaming audio data and a first device identifier of a first terminal sent by the first terminal, and receiving second live streaming image data, the live streaming audio data and a second device identifier of a second terminal sent by the second terminal;

determining a terminal having the same video mode as the first terminal and a terminal having the same video mode as the second terminal based on the first device identifier, the second device identifier, and device identifiers of other terminals in a live streaming room corresponding to the first terminal; and sending the first live streaming image data and the live streaming audio data sent by the first terminal to the terminal having the same video mode as the first terminal, and sending the second live streaming image data and the live streaming audio data sent by the second terminal to the terminal having the same video mode as the second terminal It should be understood that both the foregoing general description and the following detailed description are exemplary and explanatory only and are intended to limit the present disclosure.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and a person of ordinary skill in the art may also derive other drawings from these accompanying drawings without creative efforts.

Figure 1:
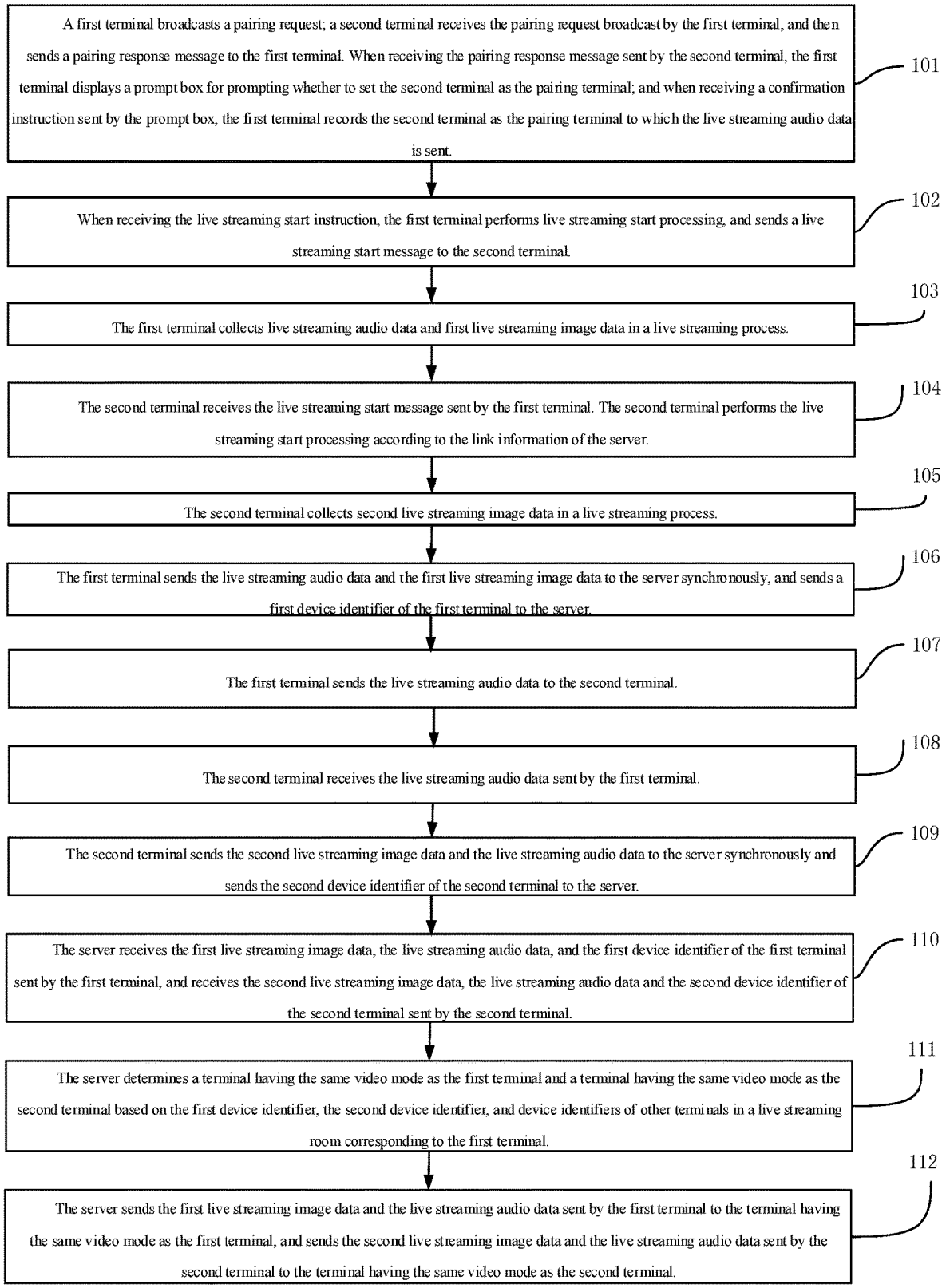
FIG. 1 is a flowchart of a method for live streaming provided by an embodiment of the present disclosure.

The specific embodiments of the present disclosure have been shown by the above drawings, and are described in more detail hereinafter. These drawings and textual descriptions are not intended to limit the concept scope of the present disclosure through any means, but are used to illustrate the concepts of the present disclosure to those skilled in the art by reference to the specific embodiments.

DETAILED DESCRIPTION

For clearer descriptions of the objectives, technical solutions and advantages of the present disclosure, the embodiments of the present disclosure are described in detail hereinafter with reference to the drawings.

For example, in live streaming of a song, an existing live streaming mode is that a host opens an application on a device such as a mobile phone or a computer and selects a song to be sung; the application plays an accompaniment of the song; and the host sings along with the accompaniment. In this process, the application may perform video collection and audio collection on the host, and sends the collected video and human audio as well as the played accompaniment audio to a streaming media server in real time. By the streaming media server, a user may watch a live stream through the application on the device such as the mobile phone or the computer. If the host uses different devices, the application used by the host may send a video stream in a horizontal screen mode (a display mode in which width is greater than height) or a video stream in a vertical screen mode (a display mode in which the width is less than height) to the streaming media server.

When the video stream send by the host application is in the horizontal screen mode, the application on the mobile phone of the user may present the video stream to the user in a half-screen manner, such that the experience of the user who watches the live stream by using the mobile phone is poor. When the video stream send by the host application is in the vertical screen mode, the application on the computer of the user may present the video stream to the user in the vertical screen mode, such that the experience of the user who watches the live stream by using the computer is poor. Thus, a display ratio of the live streaming video on the screen is not suitable for the screen for displaying the live streaming video, thereby wasting a display space of the screen for displaying the live streaming video.

In the embodiments of the present disclosure, the first terminal collects the live streaming audio data and the first live streaming image data in the live streaming process, sends the live streaming audio data and the first live streaming image data to the server, sends the first device identifier of the first terminal to the server, and sends the live streaming audio data to the second terminal; and the second terminal collects the second live streaming image data, sends the second live streaming image data and the live streaming audio data to the server, and sends the second device identifier of the second terminal to the server. In this way, the host could simultaneously send the video stream in the horizontal screen mode and the video stream in the vertical screen mode. Thus, the user could watch a live streaming video with a display ratio suitable for a terminal screen on the terminal screen no matter if the user watches the live streaming video on the terminal in a horizontal screen mode or a vertical screen mode. Therefore, a display space of the screen is utilized reasonably.

The embodiments of the present disclosure provide a method and an apparatus for live streaming. The method may be implemented by a server and a terminal, and the terminal may be a terminal capable of performing live streaming.

The server may include components such as a processor, a memory and a transceiver. The processor may be a central processing unit (CPU) or the like, and may be configured to determine a terminal having the same video mode as the first terminal, and a terminal having the same video mode as the second terminal. The memory may be an random access memory (RAM), a flash or the like, and may be configured to store received data, data required in processing, data generated in the processing, and the like; and the data may be, such as, a corresponding relationship between device identifiers and video modes, and device identifiers of the first terminal and the second terminal. The transceiver may be configured to perform data transmission with the terminal or another server, for example, receiving first live streaming image data and live streaming audio data sent by the first terminal and the first device identifier of the first terminal; receiving second live streaming image data and the live streaming audio data sent by the second terminal and the second device identifier of the second terminal; receiving a live streaming view request sent by a terminal of a viewer; and sending the live streaming image data and the live streaming audio data to the terminal of the viewer. The transceiver may include an antenna, a matching circuit, a modem, and the like.

The terminal may include components such as a processor, a memory, a transceiver, a screen, an image detecting component, an audio output component and an audio input component. The processor may be a CPU or the like, and may be configured to control a screen to display a prompt box for prompt whether to set the second terminal as a pairing terminal, and to execute a confirmation instruction of the prompt box, and the like. The memory may be a RAM, a flash or the like, and may be configured to store received data, data required in processing, data generated in the processing, and the like; and the data may be, such as, a live streaming start message, a live streaming audio data, and a device identifier. The transceiver may be configured to perform data transmission with another device, for example, receiving a pairing request, receiving a pairing response message, sending the live streaming start message, sending live streaming audio data and live streaming image data to the server, and the like. The transceiver may include an antenna, a matching circuit, a modem, and the like. The screen may be a touch screen and may be configured to display the received first data and the like. The image detecting component may be a camera or the like. The audio output component may be a speaker, an earphone, or the like. The audio input component may be a microphone, or the like.

As shown in FIG. 1, a processing flow of the method for live streaming may include the following steps.

In step 101, a first terminal broadcasts a pairing request; a second terminal receives the pairing request broadcast by the first terminal, and then sends a pairing response message to the first terminal. When receiving the pairing response message sent by the second terminal, the first terminal displays a prompt box for prompting whether to set the second terminal as the pairing terminal; and when receiving a confirmation instruction sent by the prompt box, the first terminal records the second terminal as the pairing terminal to which the live streaming audio data is sent.

In an implementation, a host may use two terminals for live streaming simultaneously during live streaming, wherein video modes of screens of the two terminals are different. For example, the first terminal may be a computer, such that the video mode of the first terminal is a horizontal screen mode; and the second terminal may be a smart phone, such that the video mode of the second terminal is a vertical screen mode. Prior to the live streaming, the host needs to pair the two terminals, such that the first terminal may send the live streaming audio data to the second terminal.

The first terminal creates a device pairing socket and sets a broadcast attribute for the socket. The first terminal sends a pairing request to N network addresses by using the pairing socket. The value range of N may be [5, 10], and the IP address of these network addresses may be the broadcast address 255.255.255.255. In this way, all terminals in this local area network may receive the pairing request broadcast by the first terminal through the broadcast address.

The second terminal creates N pairing UDP (User Datagram Protocol) sockets, wherein N herein is the same as N described in the above "the first terminal sends the pairing request to the N network addresses" to avoid a condition that the second terminal cannot receive the pairing request by using the pairing UDP sockets caused by a conflict between a bound network address of a part of the sockets and a bound network address of a socket of another program on the second terminal, and may have the value range of [5, 10]. The second terminal sets broadcast attributes for the N pairing UDP sockets, and binds network addresses A1, A2, . . . and AN to the N pairing UDP sockets, respectively. In order to improve receiving efficiency of the second terminal in receiving the pairing request, IP addresses corresponding to the network addresses may be set to a host computer arbitrary IP address 0.0.0.0. The port IDs P1, P2, . . . and PN corresponding to the N pairing UDP sockets are set to preset port ID values. For example, P1 may be 8181, and P2 may be greater than P1 by 1, that is, P2 is 8182. Similarly, the values of the remaining port IDs P3, P4 . . . are set.

After setting the N pairing UDP sockets, the second terminal receives the pairing request sent by the first terminal on one of the pairing UDP sockets, records a source network address as Asource, and closes other UDP sockets. The second terminal may obtain its own device information. For example, the device information may be a device name, a phone number or the like. The information and the port number corresponding to the UDP socket that has received the pairing request are encapsulated into a pairing response message. The second terminal sends the pairing response message to a device whose network address is Asource (i.e., the first terminal) through the UDP socket that has received the pairing request. The second terminal may also only encapsulate the port number into the pairing response message, and sends the pairing response message to the device whose network address is Asource (i.e., the first terminal) through the UDP socket that has received the pairing request, which is not limited in the present disclosure.

Figure 2:
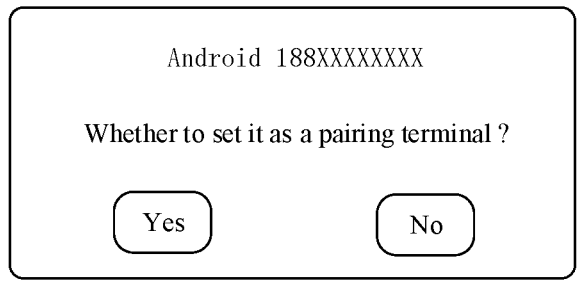
FIG. 2 is a schematic diagram of the method for live streaming according to an embodiment of the present disclosure.

When the first terminal receives the pairing response message sent by the second terminal, a prompt box may be popped up on the screen. As shown in FIG. 2, the prompt box may display the device information of the second terminal, and asks the host whether to set the second terminal as the pairing terminal. Alternatively, the prompt box may directly display whether to set the second terminal as the pairing terminal. If the host confirms that the second terminal is the terminal that he/she wants to set, he/she may click the confirmation option in the prompt box. After receiving the confirmation instruction, the first terminal records the second terminal as the pairing terminal to which the live streaming audio data is sent. Heretoforth, the first terminal and the second terminal are successfully paired.

It should be noted that if the first terminal does not receive the pairing response message sent by the second terminal, the first terminal continues to broadcast the pairing request. When the number of times that the first terminal broadcasts the pairing request exceeds a preset number of times, but the first terminal has not received the pairing response message sent by the second terminal, the first terminal displays a prompt box showing that the second terminal cannot be found, displays a possible reason why the second terminal cannot be found, such as that the second terminal does not install an application related to live streaming, to the host, and additionally, displays a download address or a two-dimensional code of this application.

It should be noted that, in this process, the first terminal also needs to create an audio sending socket; and the second terminal also needs to create an audio receiving socket, and binds the audio receiving socket to the local IP address and the port P1. If the binding fails, the audio receiving socket is bound to the local IP address and the port P2, and the operation is continued in the same manner till the binding is successful. This is a preparation for the first terminal to send the live streaming audio data to the second terminal, and details are not repeated herein.

In step 102, when receiving the live streaming start instruction, the first terminal performs live streaming start processing, and sends a live streaming start message to the second terminal, wherein the live streaming start message carries link information of the server, and the link information includes address information and a live streaming room identifier.

In an implementation, after the first terminal and the second terminal are successfully paired through the above step 101, the host may click a live streaming start option on the first terminal to perform live streaming. When receiving the live streaming start instruction input by the host, the first terminal performs the live streaming start processing, and sends the live streaming start message to the second terminal to instruct the second terminal to start the live streaming synchronously. The live streaming start message carries the link information of the server. The link information includes the address information and the live streaming room identifier. The address information is intended to instruct the second terminal to establish a network connection with the server. The live streaming room identifier is intended to instruct the second terminal to perform live streaming with the first terminal in the same live streaming room.

In step 103, the first terminal collects live streaming audio data and first live streaming image data in a live streaming process.

In an implementation, the first terminal collects the live streaming audio data and the first live streaming image data in the live streaming process. The collected live streaming audio data may be human audio, namely, the voice of the host, or may be the sound of an instrument played by the host, or the like. The collected live streaming audio data may also be audio combined by the human audio and the accompaniment audio; and the accompaniment audio is acquired and played by the first terminal.

In step 104, the second terminal receives the live streaming start message sent by the first terminal, wherein the live streaming start message carries the link information of the server; and the link information includes the address information and the live streaming room identifier. The second terminal performs the live streaming start processing according to the link information of the server.

In an implementation, after the first terminal sends a live streaming start message to the second terminal in the above step 102, the second terminal receives the live streaming start message sent by the first terminal. The live streaming start message carries the link information of the server; and the link information includes the address information and the live streaming room identifier. The second terminal determines whether the live streaming start message is received for the first time. If the live streaming start message is received for the first time, the second terminal establishes a network connection with the server according to the address information; and after the network connection is successfully established, the second terminal is triggered to start the live streaming. If the live streaming start message is not received for the first time, the message is ignored.

It should be noted that the live streaming start message further carries information such as a sampling rate, the number of sound channels, and the number of sampling bits of the live streaming audio data collected by the first terminal. The second terminal creates an audio code rate unit according to the sampling rate, the number of the sound channels, and the number of sampling bits to prepare for receiving the live streaming audio data sent by the first terminal.

In step 105, the second terminal collects second live streaming image data in a live streaming process.

The first terminal and the second terminal have different video modes, wherein the video modes include a horizontal screen mode and a vertical screen mode.

In an implementation, the second terminal collects the second live streaming image data in the live streaming process.

It should be noted that the first terminal and the second terminal have different video modes, and the video modes include the horizontal screen mode and the vertical screen mode. For example, the first terminal is a computer, and has a video mode in the horizontal screen mode; and the second terminal may be a smart phone, and has a video mode in the vertical screen mode. In this way, it may ensure that the two terminals collect different modes of videos, such that viewers who watch the live stream through the terminals in the different video modes may watch videos suitable for the modes of the used terminals, thereby improving the watching experience of the viewers.

In step 106, the first terminal sends the live streaming audio data and the first live streaming image data to the server synchronously, and sends a first device identifier of the first terminal to the server.

Figure 3:
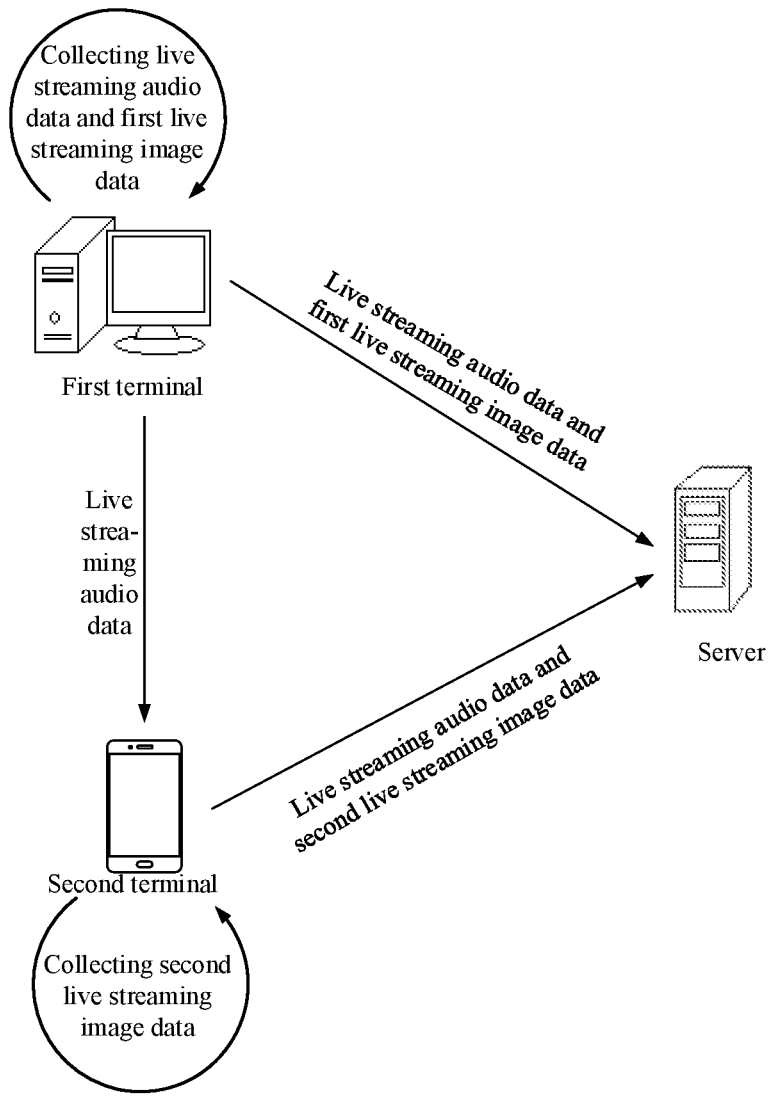
FIG. 3 is a schematic transmission diagram of the method for live streaming according to an embodiment of the present disclosure.

In an implementation, as shown in FIG. 3, the first terminal performs pre-processing, encoding and encapsulation on each frame of the collected live streaming audio data and first live streaming image data to generate a video stream in the live streaming process, and sends the video stream to the server in real time. Meanwhile, the first device identifier of the first terminal is sent to the server, such that the server may conveniently determine a video mode of the first live streaming image data according to the first device identifier.

In step 107, the first terminal sends the live streaming audio data to the second terminal, wherein the first terminal and the second terminal have different video modes, and the video modes include a horizontal screen mode and a vertical screen mode.

In an implementation, as shown in FIG. 3, every time when collecting one frame of the live streaming audio data, the first terminal encapsulates the live streaming audio data and the first live streaming image data, and sends the encapsulated live streaming audio data and first live streaming image data to the server. At the same time, the first terminal sends the live streaming audio data to the second terminal in real time through the audio sending socket created in the above step 101.

It should be noted that when collecting the live streaming audio data, the first terminal timely records a collected audio frame number AF1. That is, in the collection process, every time when collecting one frame of the live streaming audio data, the first terminal adds 1 to the collected audio frame number AF1, and sends the audio frame number AF1 and the live streaming audio data to the second terminal.

In step 108, the second terminal receives the live streaming audio data sent by the first terminal, wherein the first terminal and the second terminal have different video modes, and the video modes include a horizontal screen mode and a vertical screen mode.

In an implementation, the second terminal receives the live streaming audio data sent by the first terminal by using the audio receiving socket created in the above step 101.

It should be noted that when receiving the live streaming audio data sent by the first terminal, the second terminal timely records the number of the received audio frames, and sets the received audio frame number as AF2. When the second terminal receives one frame of the live streaming audio data sent by the first terminal, 1 is added to AF2.

Optionally, the second terminal counts a transmission packet loss rate of the live streaming audio data sent by the first terminal. The second terminal sends the transmission packet loss rate to the first terminal.

In an implementation, based on AF1 and AF2 obtained in the above steps, the transmission packet loss rate of the live streaming audio data sent by the first terminal may be calculated according to the following equation:

$$Packet\_loss\_rate=(AF1-AF2)/AF2.$$

Here, Packet_loss_rate represents the transmission packet loss rate; AF1 represents the number of the audio frames sent from the first terminal to the second terminal; and AF2 represents the number of the audio frames received by the second terminal.

After obtaining the transmission packet loss rate, the second terminal sends the transmission packet loss rate to the first terminal.

It should be noted that the second terminal may send the transmission packet loss rate to the first terminal according to a preset period, such as every 1 s; or each time when receiving 20 frames of audio, the second terminal sends the transmission packet loss rate to the first terminal, which is not limited in the present disclosure.

Optionally, the first terminal receives the transmission packet loss rate of the live streaming audio data sent by the second terminal; and if the transmission packet loss rate is greater than a preset threshold, the first terminal stops sending the live streaming audio data to the second terminal.

In an implementation, after the second terminal sends the transmission packet loss rate to the first terminal, the first terminal receives the transmission packet loss rate, and compares the received transmission packet loss rate with the preset threshold. If the transmission packet loss rate is greater than the preset threshold, it indicates that more audio frames are lost in a transmission process, which may result in poor performance of the audio received by the second terminal. Therefore, in this case, the host is reminded of an abnormal connection between the first terminal and the second terminal; and the first terminal stops sending the live streaming audio data to the second terminal, and stops the live streaming at the same time. In this way, the host may be timely reminded to solve the connection problem between the first terminal and the second terminal.

In addition, if a duration in which the first terminal has not received the transmission packet loss rate of the live streaming audio data sent by the second terminal exceeds a preset duration, it indicates that there may be a problem in the transmission between the first terminal and the second terminal. As a result, the second terminal cannot send the transmission loss rate to the first terminal. In this case, the host is reminded of the abnormal connection between the first terminal and the second terminal; and it is required to check the network and stop the live streaming of the first terminal.

In step 109, the second terminal sends the second live streaming image data and the live streaming audio data to the server synchronously, as shown in FIG. 3, and sends the second device identifier of the second terminal to the server.

In an implementation, the second terminal performs pre-processing, encoding, and encapsulation on the collected second live streaming image data and the received live streaming audio data to form a video stream, and sends the video stream to the server in real time. At the same time, the second terminal sends the second device identifier of the second terminal to the server.

Optionally, the above live streaming start message further carries a sampling rate of the live streaming audio data. In order to prevent delay of the received audio and the collected image, the second terminal adjusts a timestamp of the received audio such that a timestamp of the audio frame is the same as that of a corresponding image frame. The corresponding processing may be as follows: the second terminal determines a frame duration of each audio frame of the live streaming audio data according to the sampling rate; each time when receiving one audio frame of the live streaming audio data, the second terminal adjusts a timestamp of the received audio frame to a time obtained by subtracting the frame duration from a current time; and the second terminal synchronously sends live streaming audio data obtained after the timestamps are adjusted as well as the second live streaming image data to the server.

In an implementation, the second terminal may determine the frame duration of each of the audio frames of the live streaming audio data according to the sampling rate of the live streaming audio data carried in the live streaming start message. Then, according to a gettimeofday function (a function for obtaining a precise current time), a current time of the second terminal is obtained and converted into a time in milliseconds. A time obtained by subtracting the frame duration of each of the audio frames from the current time is determined as a new timestamp of the received audio frame.

In addition, in the above step, when the second terminal collects the second live streaming image data of each frame, the current time in milliseconds of the second terminal is determined as a timestamp of a currently collected image frame through the gettimeofday function.

Then, the second terminal synchronously sends the live streaming audio data obtained after the timestamps are adjusted as well as the second live streaming image data to the server.

In step 110, the server receives the first live streaming image data, the live streaming audio data, and the first device identifier of the first terminal sent by the first terminal, and receives the second live streaming image data, the live streaming audio data and the second device identifier of the second terminal sent by the second terminal.

In step 111, the server determines a terminal having the same video mode as the first terminal and a terminal having the same video mode as the second terminal based on the first device identifier, the second device identifier, and device identifiers of other terminals in a live streaming room corresponding to the first terminal.

Optionally, the terminal having the same video mode as the first terminal and the terminal having the same video mode as the second terminal may be determined according to the pre-established device identifier groups. The processing of the above step 111 may be as follows: a terminal whose device identifier belongs to the same device identifier group as the first device identifier and a terminal whose device identifier belongs to the same device identifier group as the second device identifier are determined from the other terminals in the live streaming room based on the pre-established device identifier groups.

The device identifier groups include a first device identifier group and a second device identifier group; a video mode of the terminal corresponding to the device identifier in the first device identifier group is a horizontal screen mode; and a video mode of the terminal corresponding to the device identifier in the second device identifier group is a vertical screen mode.

In an implementation, the server may pre-establish the first device identifier group and the second device identifier group. The video mode of the terminal corresponding to the device identifier in the first device identifier group is a horizontal screen mode; and the video mode of the terminal corresponding to the device identifier in the second device identifier group is a vertical screen mode. When a terminal of another viewer in the live streaming room initiates a live streaming view request to the server, the live streaming view request carries a device identifier of the terminal of this viewer. The server determines whether the device identifier of the terminal of the viewer belongs to the first device identifier group or the second device identifier group, and then determines a terminal whose device identifier belongs to the same device identifier group as the first device identifier and a terminal whose device identifier belongs to the same device identifier group as the second device identifier.

A correspondence between the device identifiers and the device identifier groups may be as shown in Table 1 below.

TABLE 1

| Device identifier | Video mode |
|---|---|
| Android | First device identifier group |
| iOS | |
| PC Web | Second device identifier group |

When the viewer wants to watch a live stream through the terminal, the viewer may click a live streaming view option. The terminal of the viewer sends a live streaming view request to the server, wherein the live streaming view request carries the device identifier of the terminal of the viewer. After receiving the live streaming view request, the server determines a video mode corresponding to the terminal of the viewer according to the device identifier of the terminal of the viewer, and then determines the video mode corresponding to the terminal of the viewer is the same as the video mode of the first terminal or the second terminal.

In step 112, the server sends the first live streaming image data and the live streaming audio data sent by the first terminal to the terminal having the same video mode as the first terminal, and sends the second live streaming image data and the live streaming audio data sent by the second terminal to the terminal having the same video mode as the second terminal.

Optionally, after the terminal whose device identifier belongs to the same device identifier group as the first device identifier and the terminal whose device identifier belongs to the same device identifier group as the second device identifier are determined, the processing of the above step 112 may be as follows. The server sends the first live streaming image data and the live streaming audio data sent by the first terminal to the terminal whose device identifier belongs to the same device identifier group as the first device identifier, and sends the second live streaming image data and the live streaming audio data sent by the second terminal to the terminal whose device identifier belongs to the same device identifier group as the second device identifier.

Figure 4:
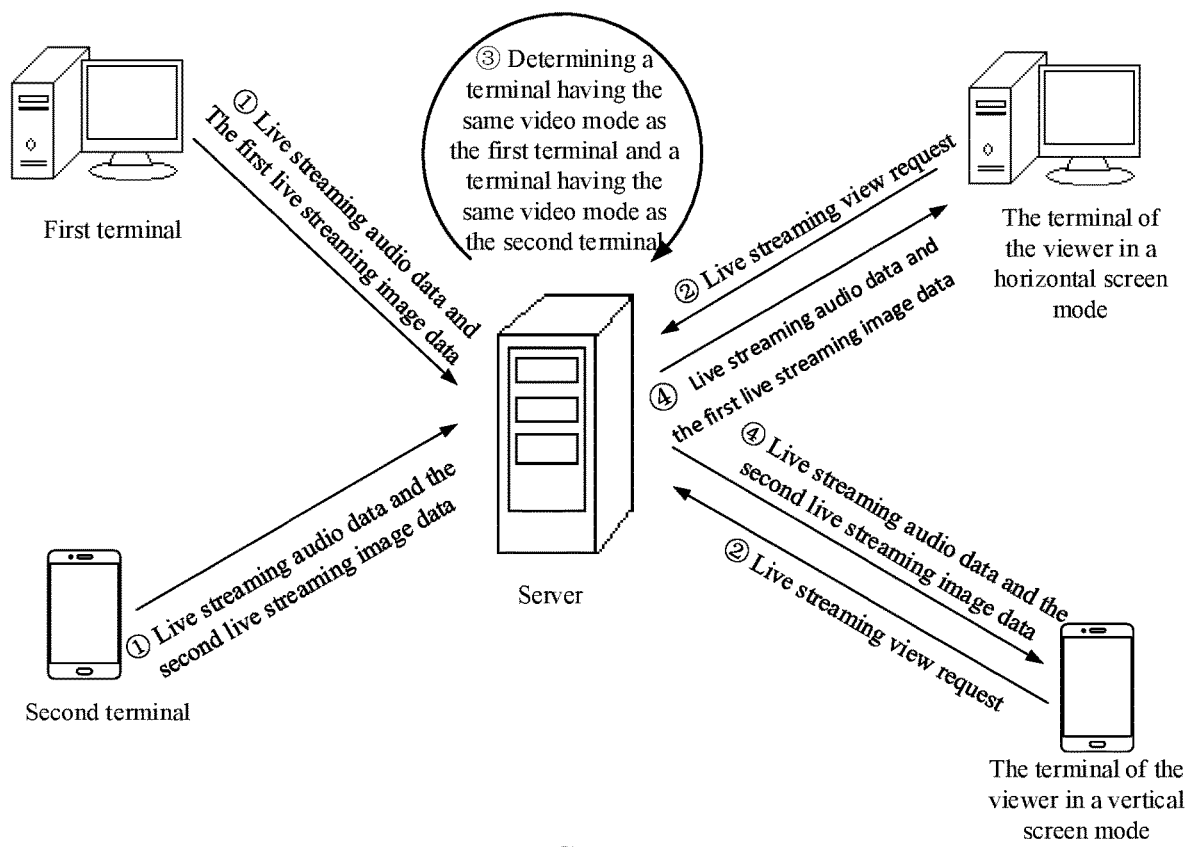
FIG. 4 is a schematic transmission diagram of the method for live streaming according to an embodiment of the present disclosure.

In an implementation, as shown in FIG. 4, after determining the terminal whose device identifier belongs to the same device identifier group as the first device identifier, the server sends the first live streaming image data and the live streaming audio data sent from the first terminal to the server to the terminal. After determining the terminal whose device identifier belongs to the same device identifier group as the second device identifier, the server sends the second live streaming image data and the live streaming audio data sent from the second terminal to the server to the terminal. In this way, on the terminal in the vertical screen mode, the live streaming video is displayed in the vertical screen mode; and on the terminal in the horizontal screen mode, the live streaming video is displayed in the horizontal screen mode. Thus, the user could watch a live streaming video with a suitable display ratio no matter which video mode that the terminal adopts. Therefore, the experience of the viewer watching the live stream is improved.

In the embodiment of the present disclosure, the first terminal collects the live streaming audio data and the first live streaming image data in the live streaming process, sends the live streaming audio data and the first live streaming image data to the server, sends the first device identifier of the first terminal to the server, and sends the live streaming audio data to the second terminal; and the second terminal collects the second live streaming image data, sends the second live streaming image data and the live streaming audio data to the server, and sends the second device identifier of the second terminal to the server. In this way, the host could simultaneously send the video stream in the horizontal screen mode and the video stream in the vertical screen mode. Thus, the user could watch a live streaming video with a display ratio suitable for a terminal screen on the terminal screen no matter whether the user watches the live streaming video on the terminal in a horizontal screen mode or a vertical screen mode. Therefore, a display space of the screen is utilized reasonably.

Figure 5:
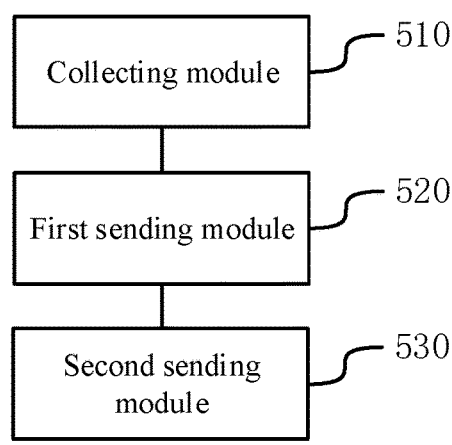
FIG. 5 is a schematic structural diagram of an apparatus for live streaming according to an embodiment of the present disclosure.

Based on the same technical concept, an embodiment of the present disclosure provides an apparatus for live streaming. The apparatus may be the first terminal in the above embodiments. As shown in FIG. 5, the apparatus includes: a collecting module 510, a first sending module 520 and a second sending module 530.

The first collecting module 510 is configured to collect live streaming audio data and first live streaming image data in a live streaming process.

The first sending module 520 is configured to send the live streaming audio data and the first live streaming image data to a server, and send a first device identifier of the first terminal to the server.

The second sending module 530 is configured to send the live streaming audio data to a second terminal.

Figure 6:
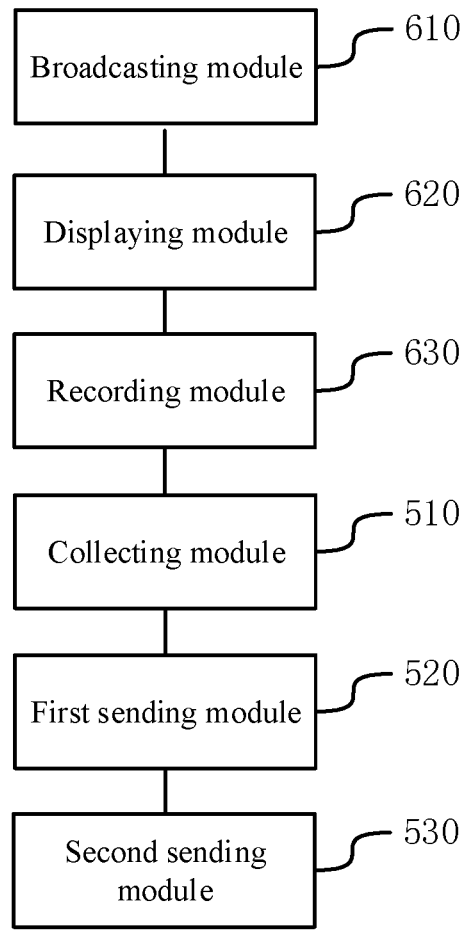
FIG. 6 is a schematic structural diagram of an apparatus for live streaming according to an embodiment of the present disclosure.

Optionally, as shown in FIG. 6, the apparatus further includes:

a broadcasting module 610, configured to broadcast a pairing request prior to the acquirement of the current live streaming audio data and first live streaming image data by the first terminal in the live streaming process;

a displaying module 620, configured to display a prompt box for prompting whether to set the second terminal as a pairing terminal when receiving a pairing response message sent by the second terminal; and a recording module 630, configured to record the second terminal as the pairing terminal to which the live streaming audio data is sent when the first terminal receives a confirmation instruction sent by the prompt box.

Figure 7:
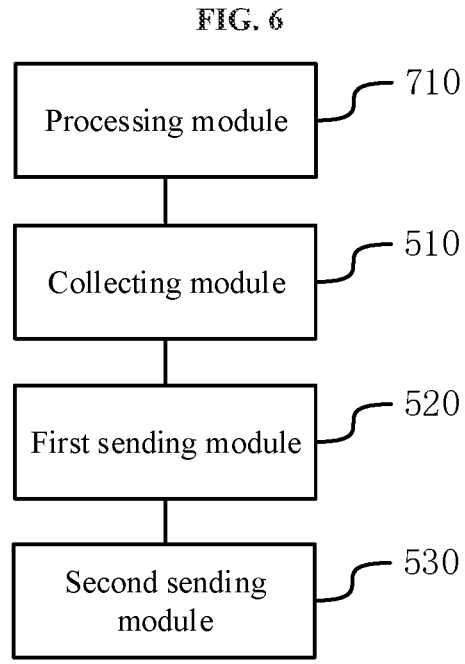
FIG. 7 is a schematic structural diagram of an apparatus for live streaming according to an embodiment of the present disclosure.

Optionally, as shown in FIG. 7, the apparatus further includes:

a processing module 1410, configured to, prior to the collection of the live streaming audio data and the first live streaming image data, perform live streaming start processing when the first terminal receives a live streaming start instruction, and send a live streaming start message to the second terminal in the live streaming process, wherein the live streaming start message carries link information of the server, and the link information includes address information and a live streaming room identifier.

Figure 8:
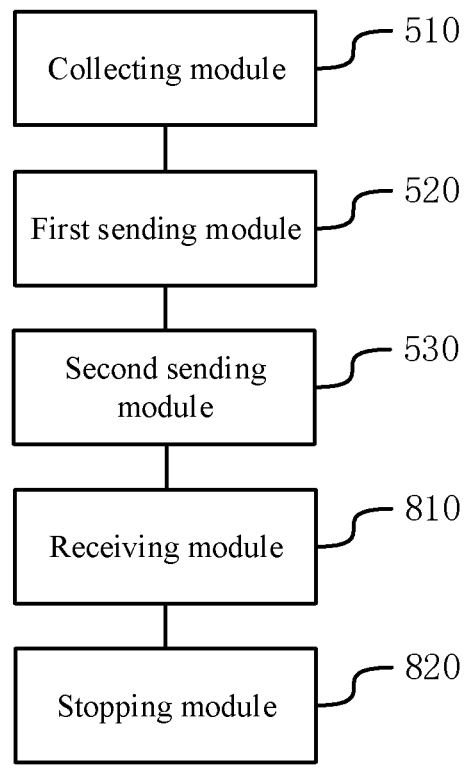
FIG. 8 is a schematic structural diagram of an apparatus for live streaming according to an embodiment of the present disclosure.

Optionally, as shown in FIG. 8, the apparatus further includes:

a receiving module 810, configured to receive a transmission packet loss rate of the live streaming audio data sent by the second terminal; and a stopping module 820, configured to stop sending the live streaming audio data to the second terminal if the transmission packet loss rate is greater than a preset threshold.

Figure 9:
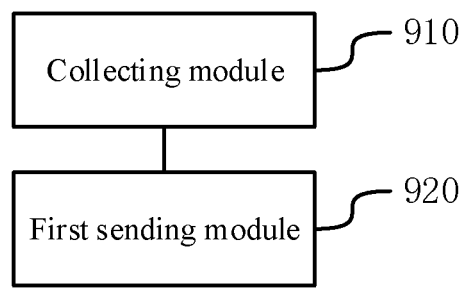
FIG. 9 is a schematic structural diagram of an apparatus for live streaming according to an embodiment of the present disclosure.

Based on the same technical concept, the embodiments of the present disclosure further provide an apparatus for live streaming. The apparatus may be the first terminal in the above embodiments. As shown in FIG. 9, the apparatus includes: a collecting module 910 and a first sending module 920.

The collecting module 910 is configured to collect second live streaming image data in a live streaming process.

The first sending module 920 is configured to synchronously send the second live streaming image data and live streaming audio data to a server, and send a second device identifier of the second terminal to the server.

Figure 10:
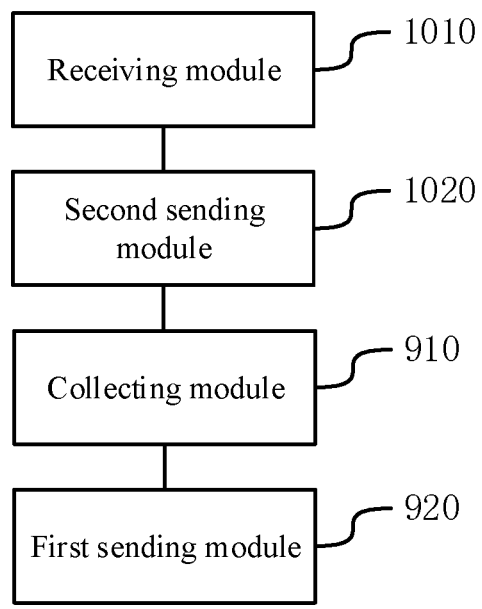
FIG. 10 is a schematic structural diagram of an apparatus for live streaming according to an embodiment of the present disclosure.

Optionally, as shown in FIG. 10, the apparatus further includes:

a receiving module 1010, configured to receive a pairing request broadcast by the first terminal; and a second sending module 1020, configured to send a pairing response message to the first terminal.

Figure 11:
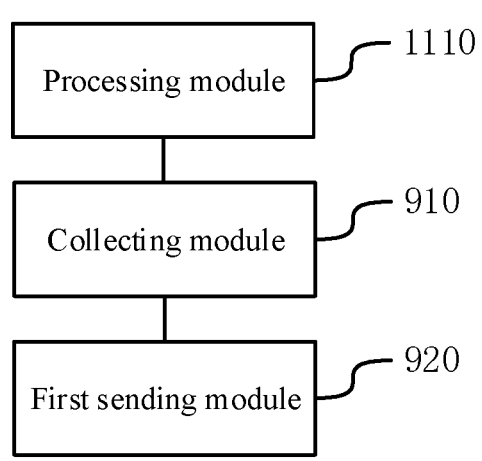
FIG. 11 is a schematic structural diagram of an apparatus for live streaming according to an embodiment of the present disclosure.

Optionally, as shown in FIG. 11, the apparatus further includes:

a processing module 1110, configured to perform live streaming start processing according to link information of the server.

Figure 12:
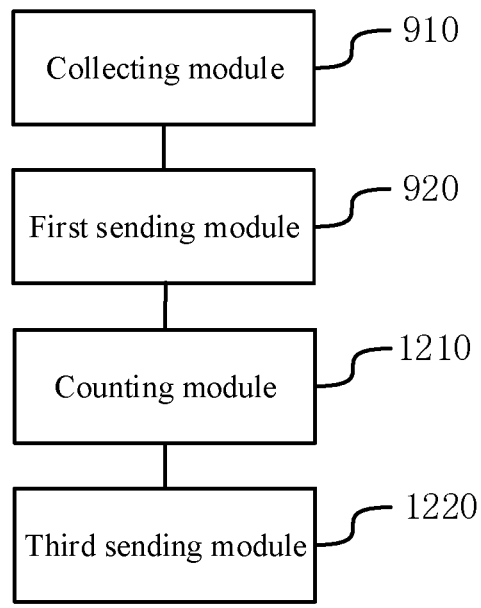
FIG. 12 is a schematic structural diagram of an apparatus for live streaming according to an embodiment of the present disclosure.

Optionally, as shown in FIG. 12, the apparatus further includes:

a counting module 1210, configured to count a transmission packet loss rate of the live streaming audio data sent by the first terminal; and a third sending module 1220, configured to send the transmission packet loss rate to the first terminal.

Optionally, the live streaming start message further carries a sampling rate of the live streaming audio data, and the first sending module 920 is configured to:

determine a frame duration of each audio frame of the live streaming audio data according to the sampling rate;

each time when receiving one audio frame of the live streaming audio data, adjust a timestamp of the received audio frame to a time obtained by subtracting the frame duration of the audio frame from a current time; and synchronously send live streaming audio data obtained after the timestamps are adjusted as well as the second live streaming image data to the server.

Figure 13:
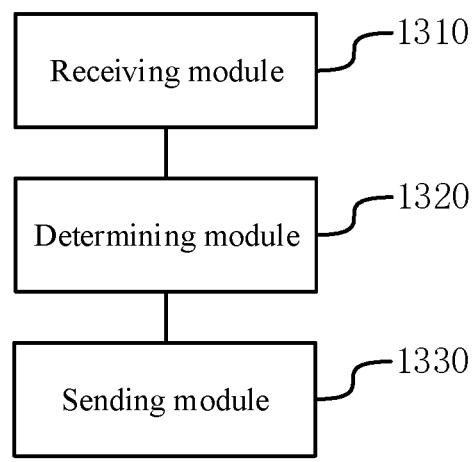
FIG. 13 is a schematic structural diagram of an apparatus for live streaming according to an embodiment of the present disclosure.

Based on the same technical concept, an embodiment of the present disclosure provides an apparatus for use in live streaming. The apparatus may be the server in the above embodiments. As shown in FIG. 13, the apparatus includes: a collecting module 1310, a determining module 1320 and a sending module 1330.

The receiving module 1310 is configured to receive first live streaming image data, live streaming audio data, and a first device identifier of a first terminal sent by the first terminal, and receive second live streaming image data, the live streaming audio data and a second device identifier of a second terminal sent by the second terminal.

The determining module 1320 is configured to determine a terminal having the same video mode as the first terminal and a terminal having the same video mode as the second terminal based on the first device identifier, the second device identifier, and device identifiers of other terminals in a live streaming room corresponding to the first terminal.

The sending module 1330 is configured to send the first live streaming image data and the live streaming audio data sent by the first terminal to the terminal having the same video mode as the first terminal, and send the second live streaming image data and the live streaming audio data sent by the second terminal to the terminal having the same video mode as the second terminal.

Optionally, the determining module 1320 is configured to:

determine a terminal whose device identifier belongs to the same device identifier group as the first device identifier and a terminal whose device identifier belongs to the same device identifier group as the second device identifier from other terminals in the live streaming room based on pre-established device identifier groups, wherein the device identifier groups include a first device identifier group and a second device identifier group; a video mode of the terminal corresponding to the device identifier in the first device identifier group is a horizontal screen mode; and a video mode of the terminal corresponding to the device identifier in the second device identifier group is a vertical screen mode.

The sending module 1330 is configured to:

send the first live streaming image data and the live streaming audio data sent by the first terminal to the terminal whose device identifier belongs to the same device identifier group as the first device identifier, and send the second live streaming image data and the live streaming audio data sent by the second terminal to the terminal whose device identifier belongs to the same device identifier group as the second device identifier.

With respect to the apparatus in the above embodiments, the specific manners for individual modules in the apparatus to perform operations have been described in detail in the embodiments of the related methods, and will not be elaborated herein.

In the embodiment of the present disclosure, the first terminal collects the live streaming audio data and the first live streaming image data in the live streaming process, sends the live streaming audio data and the first live streaming image data to the server, sends the first device identifier of the first terminal to the server, and sends the live streaming audio data to the second terminal; and the second terminal collects the second live streaming image data, receives the live streaming audio data sent by the first terminal, sends the second live streaming image data and the live streaming audio data to the server, and sends the second device identifier of the second terminal to the server. In this way, the host could simultaneously send the video stream in the horizontal screen mode and the video stream in the vertical screen mode. Thus, the user could watch a live streaming video with a display ratio suitable for a terminal screen on the terminal screen no matter if the user watches the live streaming video on the terminal in a horizontal screen mode or a vertical screen mode. Therefore, a display space of the screen is utilized reasonably.

It should be noted that, when performing live streaming, the apparatus for live streaming is only illustrated by taking division of the all functional module as an example. While in a practical application, the above functions may be assigned to different modules to be achieved according to needs. That is, an internal structure of the terminal may be divided into the different functional modules, so as to achieve all or part of the functions described above. In addition, the apparatus for live streaming and the method for live streaming provided by the forging embodiments belong to the same concept. Specific implementation processes of the apparatus may refer to the embodiments of the method, and details thereof will not be repeated herein.

Figure 14:
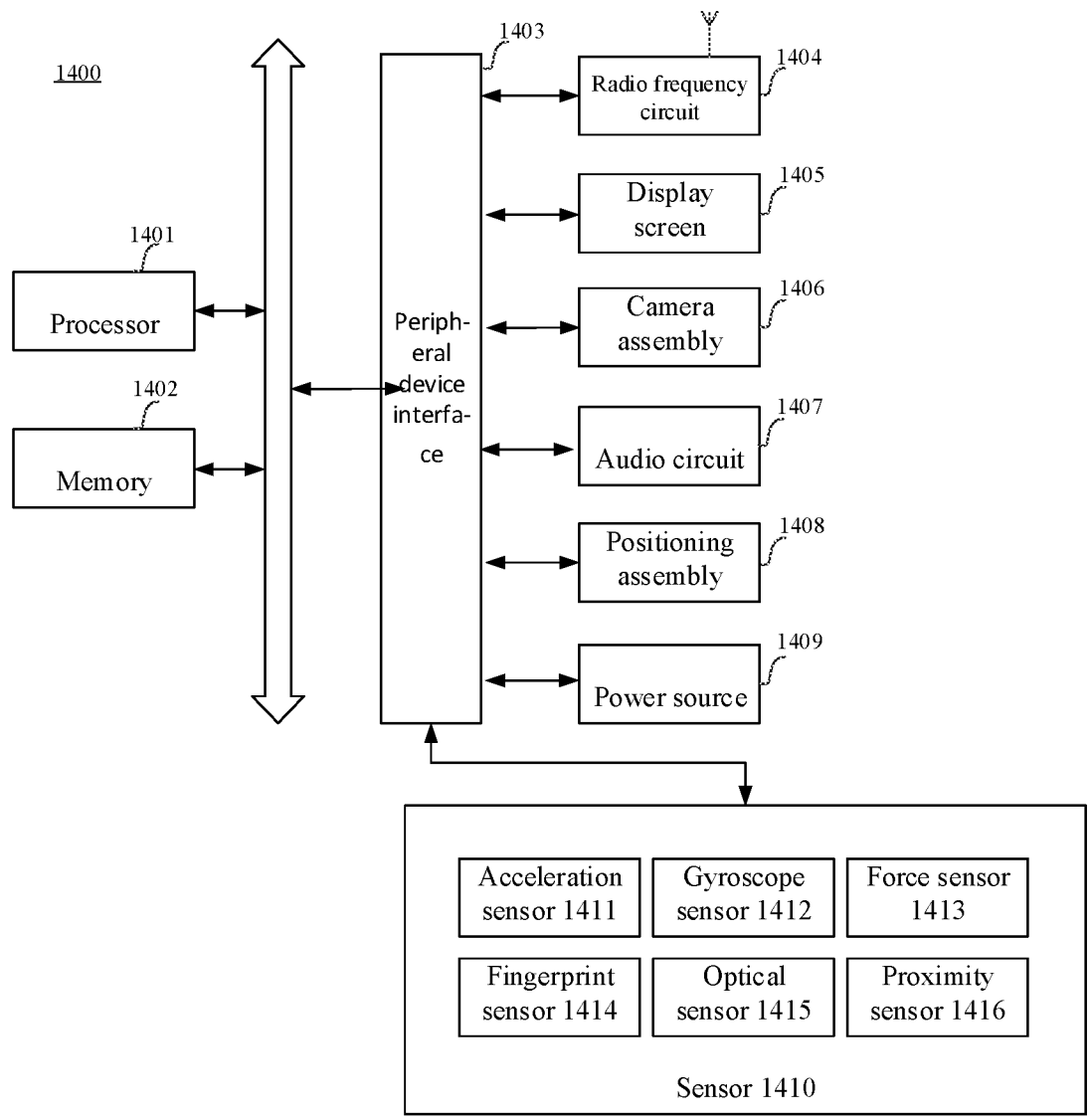
FIG. 14 is a schematic structural diagram of a terminal according to an embodiment of the present disclosure.

FIG. 14 is a structural block diagram of a terminal 1400 according to an exemplary embodiment of the present disclosure. The terminal 1400 may be a smart phone, a tablet computer, a Moving Picture Experts Group Audio Layer III (MP3) player, a Moving Picture Experts Group Audio Layer IV (MP4) player, or a laptop or desktop computer. The terminal 1400 may also be referred to as a user equipment, a portable terminal, a laptop terminal, a desktop terminal, or the like Generally, the terminal 1400 includes a processor 1401 and a memory 1402.

The processor 1401 may include one or more processing cores, such as a 4-core processor, an 8-core processor, or the like. The processor 1401 may be practiced by using at least one of hardware forms in a digital signal processor (DSP), a field-programmable gate array (FPGA) and a programmable logic array (PLA). The processor 1401 may also include a main processor and a co-processor. The main processor is a processor for processing data in an awaken state, and is also called as a central processing unit (CPU). The co-processor is a low-power processor for processing data in a standby state. In some embodiments, the processor 1401 may be integrated with a graphics processing unit (GPU) which is responsible for rendering and drawing of content required to be displayed by a display. In some embodiments, the processor 1401 may also include an artificial intelligence (AI) processor for processing a calculation operation related to machine learning.

The memory 1402 may include one or more computer-readable storage media which may be non-transitory. The memory 1402 may also include a high-speed random-access memory, as well as a non-volatile memory, such as one or more disk storage devices and flash storage devices. In some embodiments, the non-transitory computer-readable storage medium in the memory 1402 is configured to store at least one instruction which is executable by the processor 1401 to perform the method for determining the karaoke singing score according to the embodiments of the present disclosure.

In some embodiments, the terminal 1400 may optionally include a peripheral device interface 1403 and at least one peripheral device. The processor 1401, the memory 1402 and the peripheral device interface 1403 may be connected to each other via a bus or a signal line. The at least one peripheral device may be connected to the peripheral device interface 1403 via a bus, a signal line or a circuit board. Specifically, the peripheral device includes at least one of a radio frequency circuit 1404, a touch display screen 1405, a camera assembly 1406, an audio circuit 1407, a positioning assembly 1408 and a power source 1409.

The peripheral device interface 1403 may be configured to connect the at least one peripheral device related to input/output (I/O) to the processor 1401 and the memory 1402. In some embodiments, the processor 1401, the memory 1402 and the peripheral device interface 1403 are integrated on the same chip or circuit board. In some other embodiments, any one or two of the processor 1401, the memory 1402 and the peripheral device interface 1403 may be practiced on a separate chip or circuit board, which is not limited in this embodiment.

The radio frequency circuit 1404 is configured to receive and transmit a radio frequency (RF) signal, which is also referred to as an electromagnetic signal. The radio frequency circuit 1404 communicates with a communication network or another communication device via the electromagnetic signal. The radio frequency circuit 1404 converts an electrical signal to an electromagnetic signal and sends the signal, or converts a received electromagnetic signal to an electrical signal. Optionally, the radio frequency circuit 1404 includes an antenna system, an RF transceiver, one or a plurality of amplifiers, a tuner, an oscillator, a digital signal processor, a codec chip set, a subscriber identification module card or the like. The radio frequency circuit 1404 may communicate with another terminal based on a wireless communication protocol. The wireless communication protocol includes, but not limited to: a metropolitan area network, generations of mobile communication networks (including 2G, 3G, 4G and 5G), a wireless local area network and/or a wireless fidelity (WiFi) network. In some embodiments, the radio frequency circuit 1404 may further include a near field communication (NFC)-related circuits, which is not limited in the present disclosure.

The display screen 1405 may be configured to display a user interface (UI). The UE may include graphics, texts, icons, videos and any combination thereof. When the display screen 1405 is a touch display screen, the display screen 1405 may further have the capability of acquiring a touch signal on a surface of the display screen 1405 or above the surface of the display screen 1405. The touch signal may be input to the processor 1401 as a control signal, and further processed therein. In this case, the display screen 1405 may be further configured to provide a virtual button and/or a virtual keyboard or keypad, also referred to as a soft button and/or a soft keyboard or keypad. In some embodiments, one display screen 1405 may be provided, which is arranged on a front panel of the terminal 1400. In some other embodiments, at least two display screens 1405 are provided, which are respectively arranged on different surfaces of the terminal 1400 or designed in a folded fashion. In still some other embodiments, the display screen 1405 may be a flexible display screen, which is arranged on a bent surface or a folded surface of the terminal 1400. Even, the display screen 1405 may be further arranged to an irregular pattern which is non-rectangular, that is, a specially-shaped screen. The display screen 1405 may be fabricated from such materials as a liquid crystal display (LCD), an organic light-emitting diode (OLED) and the like.

The camera assembly 1406 is configured to capture an image or a video. Optionally, the camera assembly 1406 includes a front camera and a rear camera. Generally, the front camera is arranged on a front panel of the terminal, and the rear camera is arranged on a rear panel of the terminal. In some embodiments, at least two rear cameras are arranged, which are respectively any one of a primary camera, a depth of field (DOF) camera, a wide-angle camera and a long-focus camera, such that the primary camera and the DOF camera are fused to implement the background virtualization function, and the primary camera and the wide-angle camera are fused to implement the panorama photographing and virtual reality (VR) photographing functions or other fused photographing functions. In some embodiments, the camera assembly 1406 may further include a flash. The flash may be a single-color temperature flash or a double-color temperature flash. The double-color temperature flash refers to a combination of a warm-light flash and a cold-light flash, which may be used for light compensation under different color temperatures.

The audio circuit 1407 may include a microphone and a speaker. The microphone is configured to capture an acoustic wave of a user and an environment, and convert the acoustic wave to an electrical signal and output the electrical signal to the processor 1401 for further processing, or output to the radio frequency circuit 1404 to implement voice communication. For the purpose of stereo capture or noise reduction, a plurality of such microphones may be provided, which are respectively arranged at different positions of the terminal 1400. The microphone may also be a microphone array or an omnidirectional capturing microphone. The speaker is configured to convert an electrical signal from the processor 1401 or the radio frequency circuit 1404 to an acoustic wave. The speaker may be a traditional thin-film speaker, or may be a piezoelectric ceramic speaker. When the speaker is a piezoelectric ceramic speaker, an electrical signal may be converted to an acoustic wave audible by human beings, or an electrical signal may be converted to an acoustic wave inaudible by human beings for the purpose of ranging or the like. In some embodiments, the audio circuit 1407 may further include a headphone plug.

The positioning assembly 1408 is configured to determine a current geographical position of the terminal 1400 to implement navigation or a local based service (LBS). The positioning assembly 1408 may be the global positioning system (GPS) from the United States, the Beidou positioning system from China, the Grenas satellite positioning system from Russia or the Galileo satellite navigation system from the European Union.

The power source 1409 is configured to supply power for the components in the terminal 1400. The power source 1409 may be an alternating current, a direct current, a disposable battery or a rechargeable battery. When the power source 1409 includes a rechargeable battery, the rechargeable battery may support wired charging or wireless charging. The rechargeable battery may also support the supercharging technology.

In some embodiments, the terminal may further include one or a plurality of sensors 1410. The one or plurality of sensors 1410 include, but not limited to: an acceleration sensor 1411, a gyroscope sensor 1412, a pressure sensor 1413, a fingerprint sensor 1414, an optical sensor 1415 and a proximity sensor 1416.

The acceleration sensor 1411 may detect accelerations on three coordinate axes in a coordinate system established for the terminal 1400. For example, the acceleration sensor 1411 may be configured to detect components of a gravity acceleration on the three coordinate axes. The processor 1401 may control the touch display screen 1405 to display the user interface in a horizontal view or a longitudinal view based on a gravity acceleration signal acquired by the acceleration sensor 1411. The acceleration sensor 1411 may be further configured to acquire motion data of a game or a user.

The gyroscope sensor 1412 may detect a direction and a rotation angle of the terminal 1400, and the gyroscope sensor 1412 may collaborate with the acceleration sensor 1411 to capture a 3D action performed by the user for the terminal 1400. Based on the data acquired by the gyroscope sensor 1412, the processor 1401 may implement the following functions: action sensing (for example, modifying the UE based on an inclination operation of the user), image stabilization during the photographing, game control and inertial navigation.

The force sensor 1413 may be arranged on a side frame of the terminal and/or on a lowermost layer of the touch display screen 1405. When the force sensor 1413 is arranged on the side frame of the terminal 1400, a grip signal of the user against the terminal 1400 may be detected, and the processor 1401 implements left or right hand identification or performs a shortcut operation based on the grip signal acquired by the force sensor 1413. When the force sensor 1413 is arranged on the lowermost layer of the touch display screen 1405, the processor 1401 implements control of an operable control on the UI based on a force operation of the user against the touch display screen 1405. The operable control includes at least one of a button control, a scroll bar control, an icon control, and a menu control.

The fingerprint sensor 1414 is configured to acquire fingerprints of the user, and the processor 1401 determines the identity of the user based on the fingerprints acquired by the fingerprint sensor 1414, or the fingerprint sensor 1414 determines the identity of the user based on the acquired fingerprints. When it is determined that the identify of the user is trustable, the processor 1401 authorizes the user to perform related sensitive operations, wherein the sensitive operations include unlocking the screen, checking encrypted information, downloading software, paying and modifying settings and the like. The fingerprint sensor 1414 may be arranged on a front face a back face or a side face of the terminal 1400. When the terminal 1400 is provided with a physical key or a manufacturer's logo, the fingerprint sensor 1414 may be integrated with the physical key or the manufacturer's logo.

The optical sensor 1415 is configured to acquire the intensity of ambient light. In one embodiment, the processor 1401 may control a display luminance of the touch display screen 1405 based on the intensity of ambient light acquired by the optical sensor 1415. Specifically, when the intensity of ambient light is high, the display luminance of the touch display screen 1405 is up-shifted; and when the intensity of ambient light is low, the display luminance of the touch display screen 1405 is down-shifted. In another embodiment, the processor 1401 may further dynamically adjust photographing parameters of the camera assembly 1406 based on the intensity of ambient light acquired by the optical sensor.

The proximity sensor 1416, also referred to as a distance sensor, is generally arranged on the front panel of the terminal 1400. The proximity sensor 1416 is configured to acquire a distance between the user and the front face of the terminal 1400. In one embodiment, when the proximity sensor 1416 detects that the distance between the user and the front face of the terminal 1400 gradually decreases, the processor 1401 controls the touch display screen 1405 to switch from an active state to a rest state; and when the proximity sensor 1416 detects that the distance between the user and the front face of the terminal 1400 gradually increases, the processor 1401 controls the touch display screen 1405 to switch from the rest state to the active state.

A person skilled in the art may understand that the structure of the terminal as illustrated in FIG. 14 does not construe a limitation on the terminal 1400. The terminal may include more components over those illustrated in FIG. 14, or combinations of some components, or employ different component deployments.

Figure 15:
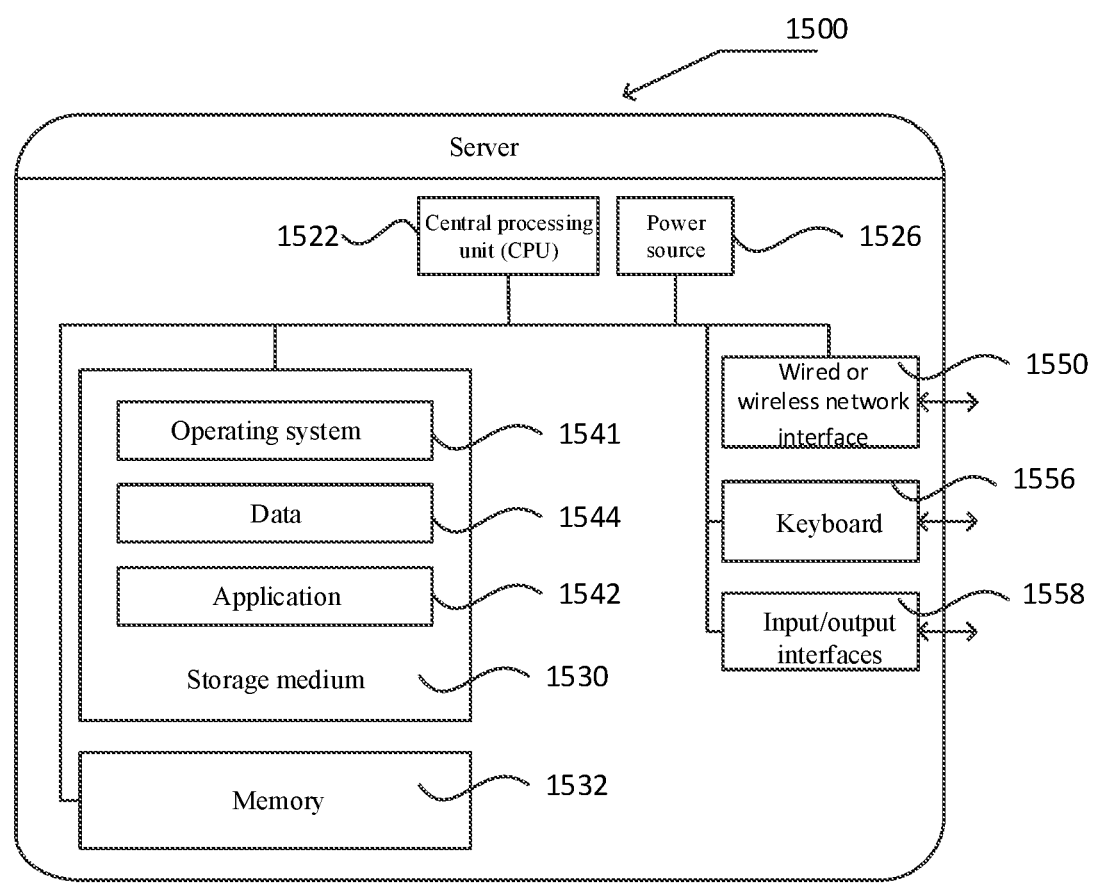
FIG. 15 is a schematic structural diagram of a server according to an embodiment of the present disclosure.

FIG. 15 is a schematic structural diagram of a server according to an embodiment of the present disclosure. The server 1500 may vary greatly depending on different configurations or performance, and may include one or more central processing units (CPUs) 1522 (e.g., one or more processors) and a memory 1532, one or more storage media 1530 (e.g., one or one mass storage devices) for storing an application 1542 or data 1544. The memory 1532 and the storage medium 1530 may be transient storage media or persistent storage media. The program stored in the storage medium 1530 may include one or more modules (not shown in this Figure), each of which may include a series of instruction operations performed by the server. Furthermore, the CPU 1522 may be communicated with the storage medium 1530, and the series of instruction operations in the storage medium 1530 may be performed on the server 1500.

The server 1500 may further include one or more power sources 1526, one or more wired or wireless network interfaces 1550, one or more input/output interfaces 1558, one or more keyboards 1556, and/or one or more operating systems 1541, such as Windows Server™, Mac OS X™, Unix™, Linux™, and FreeBSD™.

The server 1500 may include a memory, and one or more programs, wherein the one or more programs are stored in the memory and are configured to be executed by one or more processors to perform the method for live streaming described in each of the above embodiments.

In the embodiments of the present disclosure, the first terminal collects the live streaming audio data and the first live streaming image data in the live streaming process, sends the live streaming audio data and the first live streaming image data to the server, sends the first device identifier of the first terminal to the server, and sends the live streaming audio data to the second terminal, wherein video modes of the first and second terminals are different, and include a horizontal screen mode or a vertical screen mode. The second terminal collects the second live streaming image data, sends the second live streaming image data and the live streaming audio data to the server, and sends the second device identifier of the second terminal to the server. In this way, the host could simultaneously send the video stream in the horizontal screen mode and the video stream in the vertical screen mode. Thus, the user could watch a live streaming video with a display ratio suitable for a terminal screen on the terminal screen no matter if the user watches the live streaming video on the terminal in the horizontal screen mode or the vertical screen mode. Therefore, a display space of the screen is utilized reasonably.

An embodiment of the present disclosure provides an apparatus for live streaming. The apparatus includes:

a collecting module, configured to collect live streaming audio data and first live streaming image data in a live streaming process;

a first sending module, configured to send the live streaming audio data and the first live streaming image data to a server, and send a first device identifier of the first terminal to the server; and a second sending module, configured to send the live streaming audio data to a second terminal.

Optionally, the apparatus further includes:

a broadcasting module, configured to broadcast a pairing request prior to the acquirement of the current live streaming audio data and first live streaming image data by the first terminal in the live streaming process;

a displaying module, configured to display a prompt box for prompting whether to set the second terminal as a pairing terminal when the first terminal receives a pairing response message sent by the second terminal; and a recording module, configured to record the second terminal as the pairing terminal to which the live streaming audio data is sent when the first terminal receives a confirmation instruction sent by the prompt box.

Optionally, the apparatus further includes:

a processing module, configured to, prior to collection of the live streaming audio data and the first live streaming image data, perform live streaming start processing when the first terminal receives a live streaming start instruction, and send a live streaming start message to the second terminal in the live streaming process, wherein the live streaming start message carries link information of the server, and the link information includes address information and a live streaming room identifier.

Optionally, the apparatus further includes:

a receiving module, configured to receive a transmission packet loss rate of the live streaming audio data sent by the second terminal; and a stopping module, configured to stop sending the live streaming audio data to the second terminal if the transmission packet loss rate is greater than a preset threshold.

An embodiment of the present disclosure provides an apparatus for live streaming. The apparatus includes:

a collecting module, configured to collect second live streaming image data in a live streaming process; and a first sending module, configured to synchronously send the second live streaming image data and the live streaming audio data to the server, and send a second device identifier of the second terminal to the server.

Optionally, the apparatus further includes:

a receiving module, configured to receive a pairing request broadcast by the first terminal prior to collection of the second live streaming image data by the second terminal in the live streaming process; and a second sending module, configured to send a pairing response message to the first terminal.

Optionally, the apparatus further includes:

a processing module, configured to perform live streaming start processing according to link information of the server.

Optionally, the apparatus further includes:

a counting module, configured to count a transmission packet loss rate of the live streaming audio data sent by the first terminal; and a third sending module, configured to send the transmission packet loss rate to the first terminal.

Optionally, the live streaming start message further carries a sampling rate of the live streaming audio data, and the first sending module is configured to:

determine a frame duration of each audio frame of the live streaming audio data according to the sampling rate;

each time when receiving one audio frame of the live streaming audio data, adjust a timestamp of the received audio frame to a time obtained by subtracting the frame duration of the audio frame from a current time; and synchronously send live streaming audio data obtained after the timestamps are adjusted as well as the second live streaming image data to the server.

An embodiment of the present disclosure provides an apparatus for live streaming. The apparatus includes:

a receiving module, configured to receive first live streaming image data, live streaming audio data, and a first device identifier of a first terminal sent by the first terminal, and receive second live streaming image data, the live streaming audio data and a second device identifier of a second terminal sent by the second terminal;

a determining module, configured to determine a terminal having the same video mode as the first terminal and a terminal having the same video mode as the second terminal based on the first device identifier, the second device identifier, and device identifiers of other terminals in a live streaming room corresponding to the first terminal; and a sending module, configured to send the first live streaming image data and the live streaming audio data sent by the first terminal to the terminal having the same video mode as the first terminal, and send the second live streaming image data and the live streaming audio data sent by the second terminal to the terminal having the same video mode as the second terminal.

Optionally, the determining module is configured to:

determine a terminal whose device identifier belongs to the same device identifier group as the first device identifier and a terminal whose device identifier belongs to the same device identifier group as the second device identifier from other terminals in the live streaming room based on pre-established device identifier groups, wherein the device identifier groups include a first device identifier group and a second device identifier group; a video mode of the terminal corresponding to the device identifier in the first device identifier group is a horizontal screen mode; and a video mode of the terminal corresponding to the device identifier in the second device identifier group is a vertical screen mode.

The sending module is configured to:

send the first live streaming image data and the live streaming audio data sent by the first terminal to the terminal whose device identifier belongs to the same device identifier group as the first device identifier, and send the second live streaming image data and the live streaming audio data sent by the second terminal to the terminal whose device identifier belongs to the same device identifier group as the second device identifier.

Persons of ordinary skill in the art may understand that all or part of the steps described in the above embodiments may be completed through hardware, or through relevant hardware instructed by applications stored in a non-transitory computer readable storage medium, such as a read-only memory, a disk or a CD.

Described above are merely preferred embodiments of the present disclosure, and are not intended to limit the present disclosure. Within the spirit and principles of the disclosure, any modifications, equivalent substitutions, or improvements are within the protection scope of the present disclosure.

What is claimed is:

1. A method for live streaming, comprising:
   collecting, by a first terminal, live streaming audio data and first live streaming image data in a live streaming process;
   sending, by the first terminal, the live streaming audio data and the first live streaming image data to a server, and sending, by the first terminal, a first device identifier of the first terminal to the server;
   sending, by the first terminal, the live streaming audio data to a second terminal;
   collecting, by the second terminal, second live streaming image data; and
   sending, by the second terminal, the second live streaming image data and the live streaming audio data to the server, and sending, by the second terminal, a second device identifier of the second terminal to the server,
   wherein upon the sending the second device identifier of the second terminal to the server, the method further comprises:
   determining, by the server, a terminal having the same current video mode as the first terminal and a terminal having the same current video mode as the second terminal based on the first device identifier, the second device identifier, and device identifiers of other terminals in a live streaming room corresponding to the first terminal, wherein the video modes comprise a horizontal screen mode and a vertical screen mode; and
   sending, by the server, the first live streaming image data and the live streaming audio data sent by the first terminal to the terminal having the same current video mode as the first terminal, and sending, by the server, the second live streaming image data and the live streaming audio data sent by the second terminal to the terminal having the same current video mode as the second terminal.

2. The method according to claim 1, wherein prior to the collecting, by the first terminal, the live streaming audio data and the first live streaming image data in the live streaming process, the method further comprises:
   broadcasting, by the first terminal, a pairing request;
   receiving, by the second terminal, the pairing request broadcast by the first terminal;
   sending, by the second terminal, a pairing response message to the first terminal;
   displaying, by the first terminal, a prompt box for prompting whether to set the second terminal as a pairing terminal when the first terminal receives the pairing response message sent by the second terminal; and
   recording, by the first terminal, the second terminal as the pairing terminal to which the live streaming audio data is sent when the first terminal receives a confirmation instruction sent by the prompt box.

3. The method according to claim 1, wherein prior to the collecting, by the first terminal, the live streaming audio data and the first live streaming image data in the live streaming process, the method further comprises:
   performing, by the first terminal, live streaming start processing when the first terminal receives a live streaming start instruction, and sending, by the first terminal, a live streaming start message to the second terminal, the live streaming start message carrying link information of the server, and the link information comprising address information and a live streaming room identifier; and
   performing, by the second terminal, the live streaming start processing according to the link information of the server.

4. The method according to claim 1, further comprising:
   counting, by the second terminal, a transmission packet loss rate of the live streaming audio data sent by the first terminal;
   sending, by the second terminal, the transmission packet loss rate to the first terminal; and
   stopping, by the first terminal, sending the live streaming audio data to the second terminal if the transmission packet loss rate is greater than a preset threshold.

5. The method according to claim 1, wherein the live streaming start message further carries a sampling rate of the live streaming audio data, and the sending, by the second terminal, the second live streaming image data and the live streaming audio data to the server comprises:
   determining, by the second terminal, a frame duration of each audio frame of the live streaming audio data according to the sampling rate;
   each time when the second terminal receives one audio frame of the live streaming audio data, adjusting, by the second terminal, a timestamp of the received audio frame to a time obtained by subtracting the frame duration of the audio frame from a current time; and
   sending, by the second terminal, live streaming audio data obtained after the timestamps are adjusted as well as the second live streaming image data to the server.

6. The method according to claim 1, wherein video modes of the first terminal and the second terminal are different, and comprise a horizontal screen mode and a vertical screen mode.

7. A system, comprising: a first terminal, a second terminal and a server, wherein
   the first terminal is configured to perform the method as defined in claim 1;
   the second terminal is configured to perform the method as defined in claim 1; and
   the server is configured to perform a method comprising:
   receiving, by the server, first live streaming image data, live streaming audio data and a first device identifier of the first terminal sent by the first terminal, and receiving, by the server, second live streaming image data, the live streaming audio data and a second device identifier of the second terminal sent by the second terminal;
   determining, by the server, a terminal having the same current video mode as the first terminal and a terminal having the same current video mode as the second terminal based on the first device identifier, the second device identifier, and device identifiers of other terminals in a live streaming room corresponding to the first terminal, wherein the video modes comprise a horizontal screen mode and a vertical screen mode; and sending, by the server, the first live streaming image data and the live streaming audio data sent by the first terminal to the terminal having the same current video mode as the first terminal, and sending, by the server, the second live streaming image data and the live streaming audio data sent by the second terminal to the terminal having the same current video mode as the second terminal.

8. An electronic device, comprising: a processor and a memory, wherein the memory stores at least one instruction, at least one program, a code set or an instruction set which is loaded and executed by the processor to perform the method for live streaming as defined in claim 1.

9. A non-transitory computer-readable storage medium, comprising at least one instruction, at least one program, a code set or an instruction set stored thereon which is loaded and executed by a processor to perform the method for live streaming as defined in claim 1.

10. An apparatus for use in live streaming, comprising:
a processor; and
a memory for storing instructions executable by the processor;
wherein the processor is configured to execute instructions executable by the first terminal in the method as defined in claim 1.

11. An apparatus for use in live streaming, comprising:
a processor; and
a memory for storing instructions executable by the processor;
wherein the processor is configured to execute instructions executable by the second terminal in the method as defined in claim 1.

* * * * *